(12) United States Patent
Terashima et al.

(10) Patent No.: US 7,433,091 B2
(45) Date of Patent: Oct. 7, 2008

(54) IMAGE FORMING AND READING APPARATUS

(75) Inventors: Hideyuki Terashima, Chiba-ken (JP); Akio Okubo, Tokyo (JP); Takashi Awai, Chiba-ken (JP); Yoshiaki Suzuki, Chiba-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 985 days.

(21) Appl. No.: 10/720,217

(22) Filed: Nov. 25, 2003

(65) Prior Publication Data

US 2004/0105109 A1 Jun. 3, 2004

(30) Foreign Application Priority Data

Nov. 28, 2002 (JP) ............................. 2002-345310
Nov. 28, 2002 (JP) ............................. 2002-345311

(51) Int. Cl.
*H04N 1/04* (2006.01)

(52) U.S. Cl. .................... 358/474; 358/1.12; 358/498; 358/488; 358/497; 271/117; 271/10.03; 399/370; 399/367

(58) Field of Classification Search ................ 358/474, 358/398, 487, 488, 497, 400; 271/117, 10.03; 399/370, 367
See application file for complete search history.

(56) References Cited

U.S. PATENT DOCUMENTS

| | | | | |
|---|---|---|---|---|
| 4,583,126 A | 4/1986 | Stoffel | ......................... | 358/294 |
| 4,622,594 A | 11/1986 | Honjo et al. | ................. | 358/293 |
| 4,684,999 A * | 8/1987 | Sakakibara et al. | .......... | 358/452 |
| 4,763,167 A | 8/1988 | Watanabe et al. | .............. | 355/14 |
| 4,786,921 A | 11/1988 | Suzuki | ......................... | 345/150 |
| 4,797,945 A | 1/1989 | Suzuki et al. | .................. | 382/56 |
| 4,868,684 A | 9/1989 | Suzuki | ......................... | 358/455 |
| 4,870,499 A | 9/1989 | Suzuki et al. | ................ | 358/443 |
| 4,897,734 A | 1/1990 | Sato et al. | .................... | 358/448 |
| 5,021,876 A | 6/1991 | Kurita et al. | ................... | 358/75 |
| 5,032,928 A | 7/1991 | Sakai et al. | .................. | 358/448 |
| 5,065,446 A | 11/1991 | Suzuki et al. | .................. | 382/56 |
| 5,079,625 A | 1/1992 | Kitamura et al. | .............. | 358/75 |
| 5,089,884 A | 2/1992 | Suzuki et al. | .................. | 358/80 |
| 5,105,279 A | 4/1992 | Kamada et al. | ............. | 358/296 |
| 5,121,230 A | 6/1992 | Honma et al. | .................. | 358/75 |

(Continued)

FOREIGN PATENT DOCUMENTS

JP 62-141261 6/1987

(Continued)

*Primary Examiner*—Edward L. Coles, Sr.
*Assistant Examiner*—Negussie Worku
(74) *Attorney, Agent, or Firm*—Fitzpatrick, Cella, Harper & Scinto

(57) ABSTRACT

An image forming and reading apparatus includes an image forming portion for forming an image on a fed recording sheet and an image reading portion for reading the image of a fed document. At least a portion of the feeding path of the recording sheet is common to at least a portion of the feeding path of the document, and the image reading portion can be set to a first position moved from the common feeding path and to a second position at which the image of the document that is fed through the common feeding path is read, and a reading position at which the image is read by the image reading portion is located downstream of the image forming portion in a recording sheet feeding direction.

3 Claims, 9 Drawing Sheets

U.S. PATENT DOCUMENTS

| | | | |
|---|---|---|---|
| 5,187,593 A | 2/1993 | Kurita et al. | 358/434 |
| 5,204,759 A | 4/1993 | Sakai et al. | 358/444 |
| 5,485,288 A | 1/1996 | Kamei et al. | 358/530 |
| 5,539,538 A * | 7/1996 | Terao | 358/498 |
| 5,677,774 A | 10/1997 | Kunishi et al. | 358/448 |
| 5,691,827 A | 11/1997 | Kamei et al. | 358/530 |
| 5,699,167 A | 12/1997 | Nozaki et al. | 358/298 |
| 5,732,161 A | 3/1998 | Kuroda et al. | 382/284 |
| 5,748,773 A | 5/1998 | Tashiro et al. | 382/169 |
| 5,760,926 A * | 6/1998 | Howard et al. | 358/498 |
| 5,771,314 A | 6/1998 | Kunishi et al. | 382/176 |
| 5,880,852 A * | 3/1999 | Asano et al. | 358/296 |
| 5,933,587 A | 8/1999 | Sakai et al. | 395/115 |
| 6,113,207 A | 9/2000 | Nakano et al. | 347/3 |
| 6,134,023 A | 10/2000 | Nozaki et al. | 358/1.9 |
| 6,198,553 B1 | 3/2001 | Yamamoto et al. | 358/520 |
| 6,246,484 B1 | 6/2001 | Shimamura et al. | 358/1.12 |
| 6,961,152 B1 * | 11/2005 | Watanabe et al. | 358/296 |
| 7,139,108 B2 * | 11/2006 | Andersen et al. | 358/474 |

FOREIGN PATENT DOCUMENTS

| | | |
|---|---|---|
| JP | 5-77143 | 3/1993 |
| JP | 9-329931 | 12/1997 |
| JP | 11-187192 | 7/1999 |

* cited by examiner (a)

First white reference position (b)

Second white reference position (cleaning position)

IMAGE FORMING AND READING APPARATUS

BACKGROUND OF THE INVENTION

1. Field of the Invention

The present invention relates to an image forming and reading apparatus having a reading means for reading the image of a document and an image forming means for recording the image on a recording sheet, and more particularly, to an image forming and reading apparatus such as a facsimile, a copy machine, a scanner printer, and the like.

2. Related Background Art

A known image forming and reading apparatus will be explained using, for example, a facsimile apparatus shown in FIG. 9. The facsimile apparatus includes an image reading device A and an image forming device B, and the arrangements of them will be explained below.

In FIG. 9, first, the arrangement of the image reading device A will be explained. Reference numeral 201 denotes a document base plate on which documents 202 are stacked, 203 and 204 denote a document separating press piece and a document separation roller, respectively for separating and feeding the plurality of documents 202 stacked on the document base plate 201 one by one.

Reference numeral 205 denotes an intimate contact type image sensor for reading the image of a document, and the image sensor 205 is pressed against a confronting reading roller 206. The intimate contact type image sensor 205 reads the image of the document separated and fed by the document separation roller 204 by subjecting the image to photoelectric conversion. Further, the reading roller 206 feeds the document downstream while causing the document to be in intimate contact with the intimate contact type image sensor 205.

Reference numeral 207 and 208 denote upper and lower document guides, respectively, and these guides form a document feeding path. The document separating press piece 203 and the reading roller 206 are attached to the upper document guide 207. Further, the lower document guide 208 holds the intimate contact type image sensor 205 and the document separation roller 204.

Next, the arrangement of the image forming device B will be explained. Reference numeral 211 denotes a recording sheet holder in which recording sheets 212 are stacked. Reference numeral 213 denotes a pick-up roller for separating and feeding the recording sheets 212 stacked in the sheet holder 211 one by one in cooperation with a separation claw 214. An image forming unit 216 includes a recording head cartridge 219 composed of a recording head 217 integrated with an ink tank 218.

The recording head cartridge 219 is mounted on a carriage 220 which can be moved in a vertical direction in the figure (recording sheet width direction) by a not shown drive mechanism. Reference numeral 221 denotes a platen roller disposed in confrontation with the recording head 217, and the platen roller 221 supports and feeds the recording sheet fed to a recording position.

Reference numeral 222 denotes a recording sheet presser member that presses the upper surface of a recording sheet onto the platen roller 221 so that a predetermined interval is kept between the recording sheet 212 and the recording head 217.

Reference numeral 223 denotes a discharge roller for feeding and discharging a recording sheet on which an image has been recorded. Reference numeral 224 denotes a spur pressed against the discharge roller 223, and the spur 224 is composed of a material which does not contaminate a recording surface, for example, stainless steel, plastic, and the like. Reference numeral 225 denotes a recording sheet discharge port for discharging a recording sheet to the outside of the apparatus. Reference numeral 226 denotes a controller for controlling the transmission, reception, and copy functions of the facsimile apparatus.

However, as shown in FIG. 9, the known image forming and reading apparatus has a problem in that the apparatus is increased in size because the feeding path and the transportation means of a recording sheet and the feeding path and the feeding means of a document are disposed in different spaces that are spaced apart from each other.

Further, the known apparatus is disadvantageous in that a manufacturing cost is increased because each of the feeding paths of the recording sheet and the document is provided with the guide member, the roller means and the like.

SUMMARY OF THE INVENTION

An object of the present invention, which was made to solve the above problems, is to provide a small and less expensive image forming and reading apparatus by reducing the number of parts.

To achieve the above object, a typical arrangement according to the present invention is characterized in an image forming and reading apparatus that comprises an image forming means for forming an image on a fed recording sheet and an image reading means for reading the image of a fed document, wherein at least a portion of the feeding path of the recording sheet is common to at least a portion of the feeding path of the document, and the image reading means can be set to a first position evacuated (moved) from the common feeding path and to a second position at which the image of the document that is fed through the common feeding path is read, and a reading position at which the image is read by the image reading means is located downstream of the image forming means in a recording sheet feeding direction.

According to the present invention, there can be provided a small and less expensive image forming and reading apparatus by reducing the number of parts by commonly using at least a portion of the feeding paths of the recording sheet and the document. In addition to the above, the image can be read in high quality because it can be prevented that the reading means is contaminated or damaged by the recording sheet, when the recording sheet is fed, by evacuating the reading means from the common feeding path.

Further, the reading means can be easily cleaned, the dart of the reading density reference member is prevented, and reading quality is improved and stabilized by the image reading means faces in a different direction when it evacuated from the common feeding path.

Further, the document can be easily processed when it is jammed by disposing the image reading means downstream of the image forming means, that is, on the front side of the apparatus.

On the contrary, a recorded image can be prevented from being contaminated or disturbed by that it comes into contact with the reading means, thereby a high quality image can be recorded.

Further, since the reading density reference member is evacuated from the common feeding path together with the image reading means, when the document and the recording sheet are commonly fed, the document is not contaminated even if a platen is contaminated in the formation of the image. Further, the density reference member can be also prevented from being contaminated with the ink by the image forming means.

DETAILED DESCRIPTION OF THE PREFERRED EMBODIMENTS

An image forming and reading apparatus according to an embodiment of the present invention will be explained with reference to the figures. However, the scope of the present invention is by no means limited only to the size, the material, and the shape of the components, the relative positions of the components, and the like described in the embodiment unless otherwise specified.

First, the schematic arrangement of the image forming and reading apparatus that includes an image forming means for recording an image on a recording sheet and an image reading means for reading the image of a document will be explained as the embodiment of the present invention. The apparatus has an image forming unit having the recording function and a reading unit having the scanner function, and these units are disposed in a feeding path common to the recording sheet and the document.

[Overall Arrangement of Apparatus]

Figure 1:
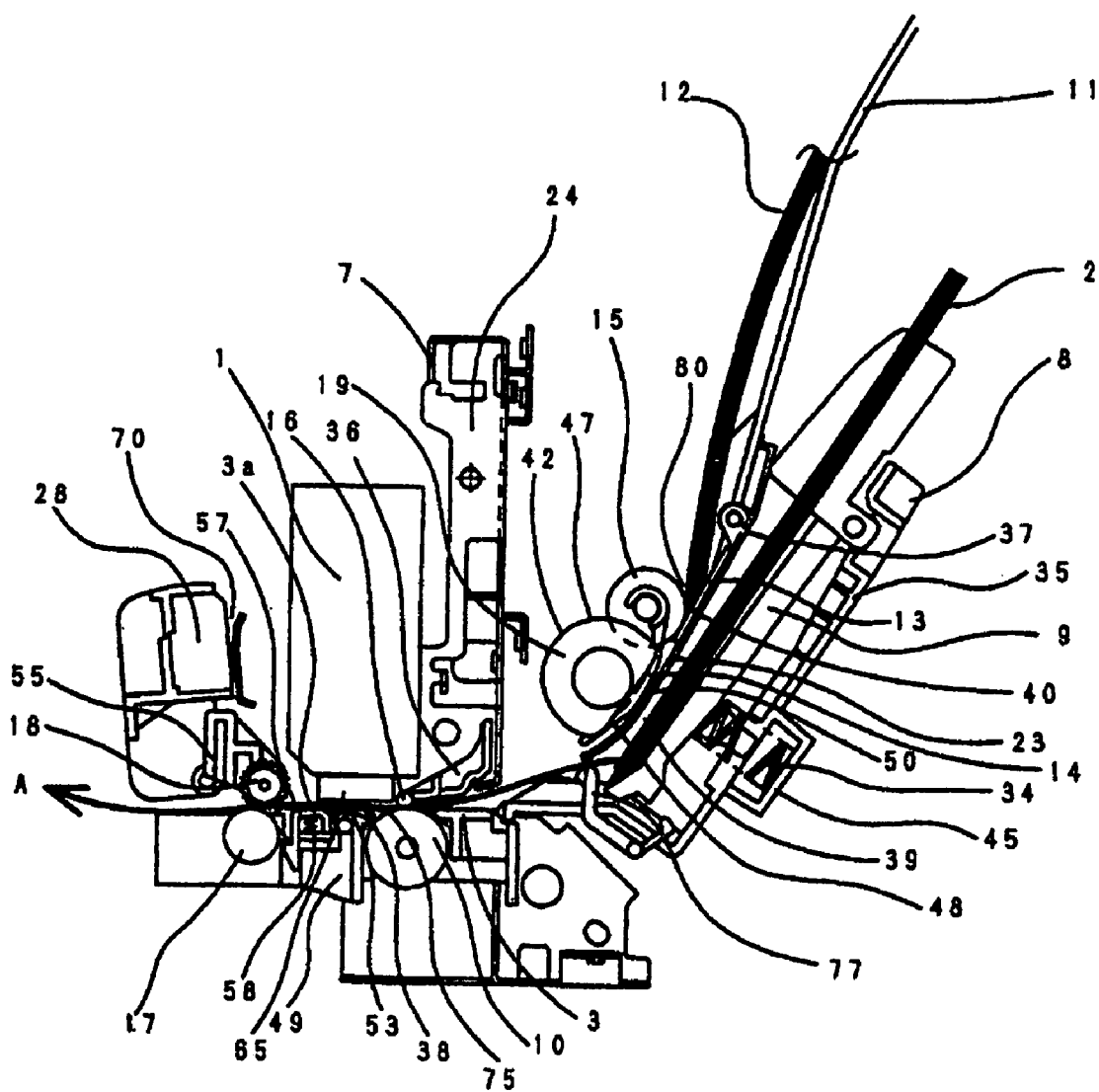
FIG. 1 is a sectional view of an image forming and reading apparatus showing the overall arrangement of the apparatus and a first CS holder position.
Figure 2:
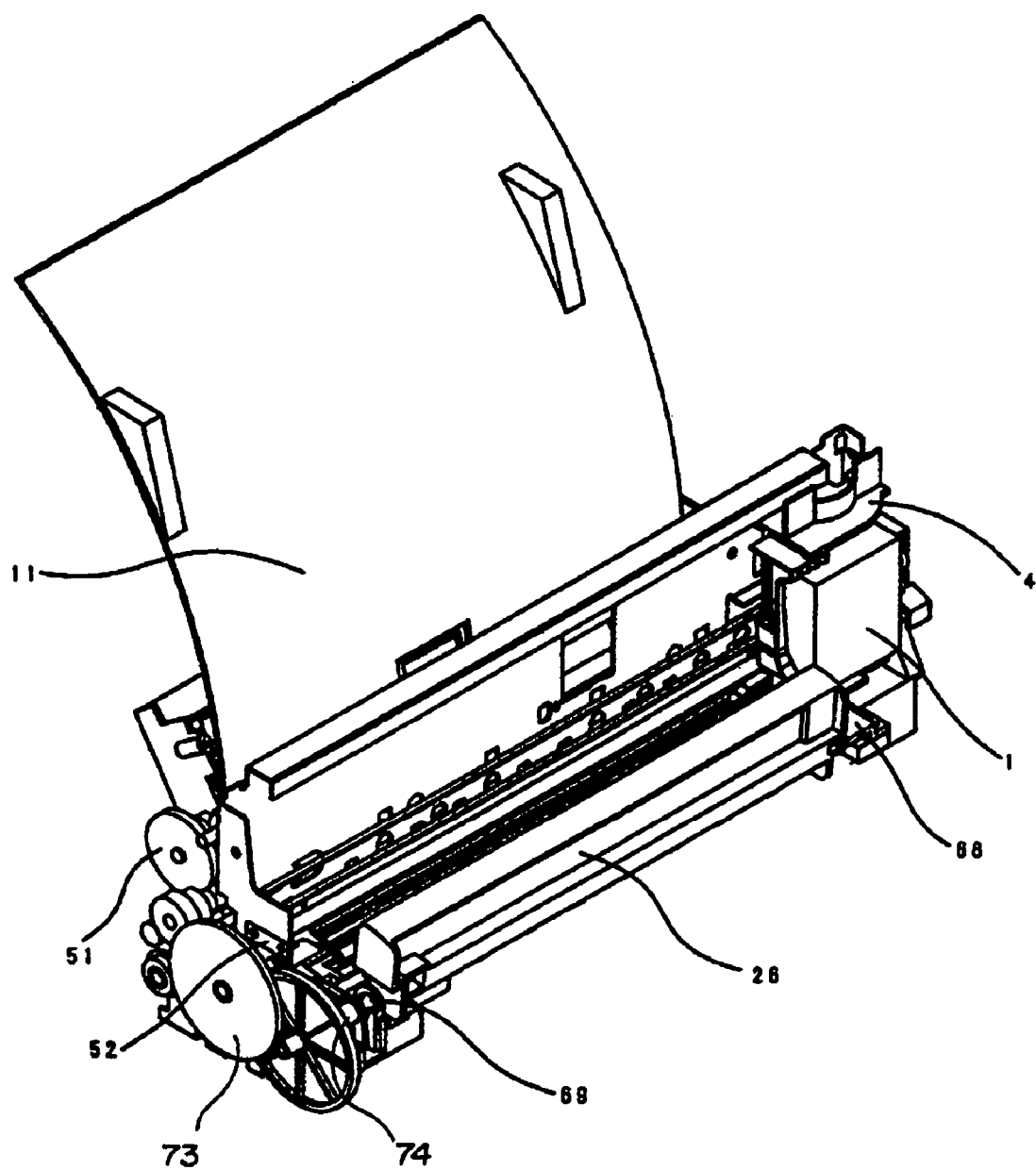
FIG. 2 is a perspective view of the image forming and reading apparatus showing the overall arrangement of the apparatus and the first CS holder position.
Figure 6:
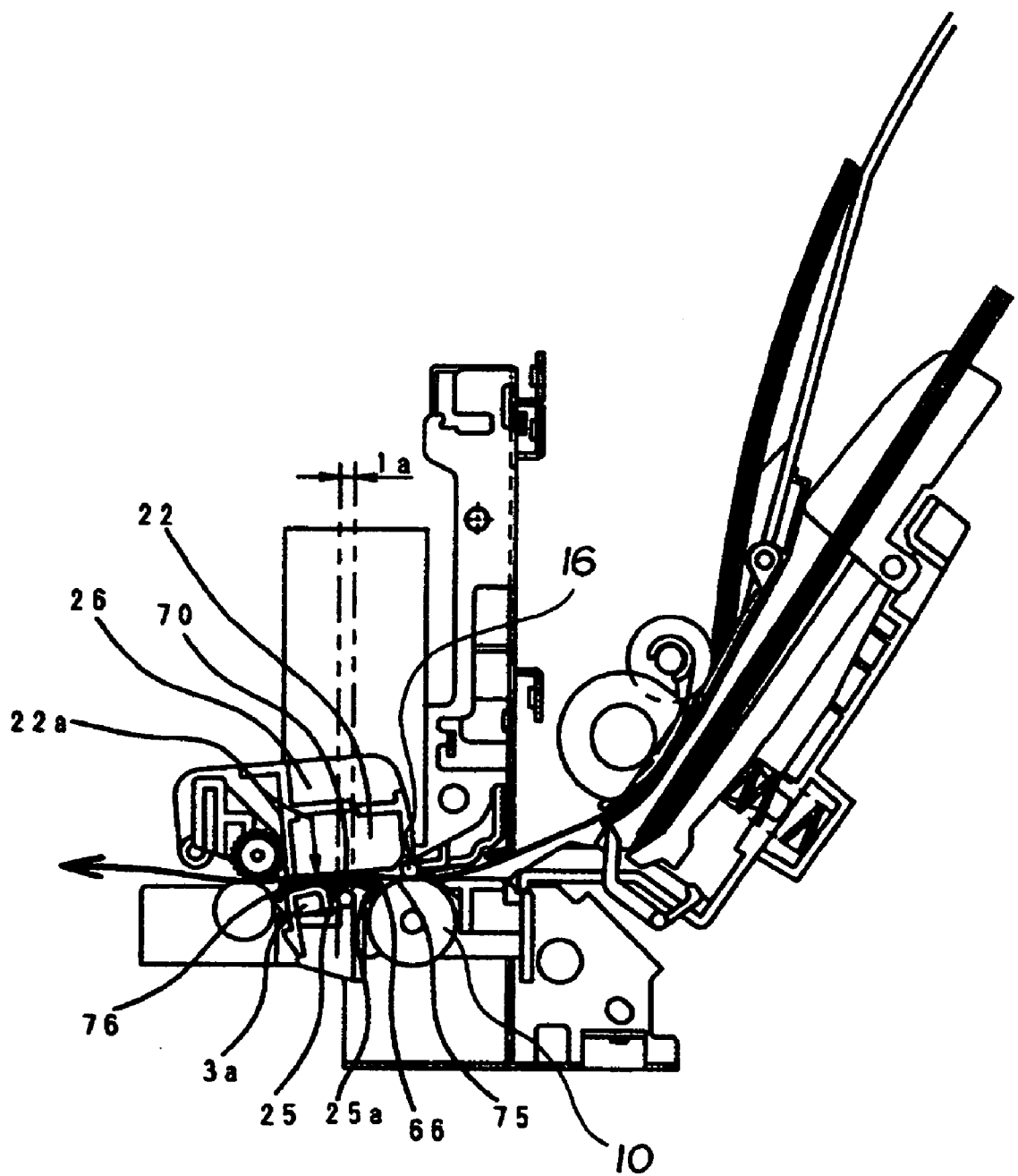
FIG. 6 is a sectional view of the image forming and reading apparatus showing a reading operation and the flow of a document in the apparatus and a second CS holder position.

FIGS. 1 and 2 are sectional view and a perspective view of the apparatus. In FIG. 1, a recording sheet feed unit (ASF) 39 and a document feed unit (ADF) 40 are disposed in a rear portion of the apparatus (on the right side in FIG. 1). The recording sheet feed unit 39 has a recording sheet bundle 2 stacked thereon, separates recording sheets from the recording sheet bundle 2 one by one as necessary, and feeds the recording sheets to the image forming unit 38. The document feed unit 40 has documents 12 stacked thereon, separate the documents 12 one by one and feeds them to the image reading unit 28. FIG. 6 shows a state of the image reading unit 28 in a reading mode of the apparatus.

[Recording Sheet Feed Unit]

Figure 3:
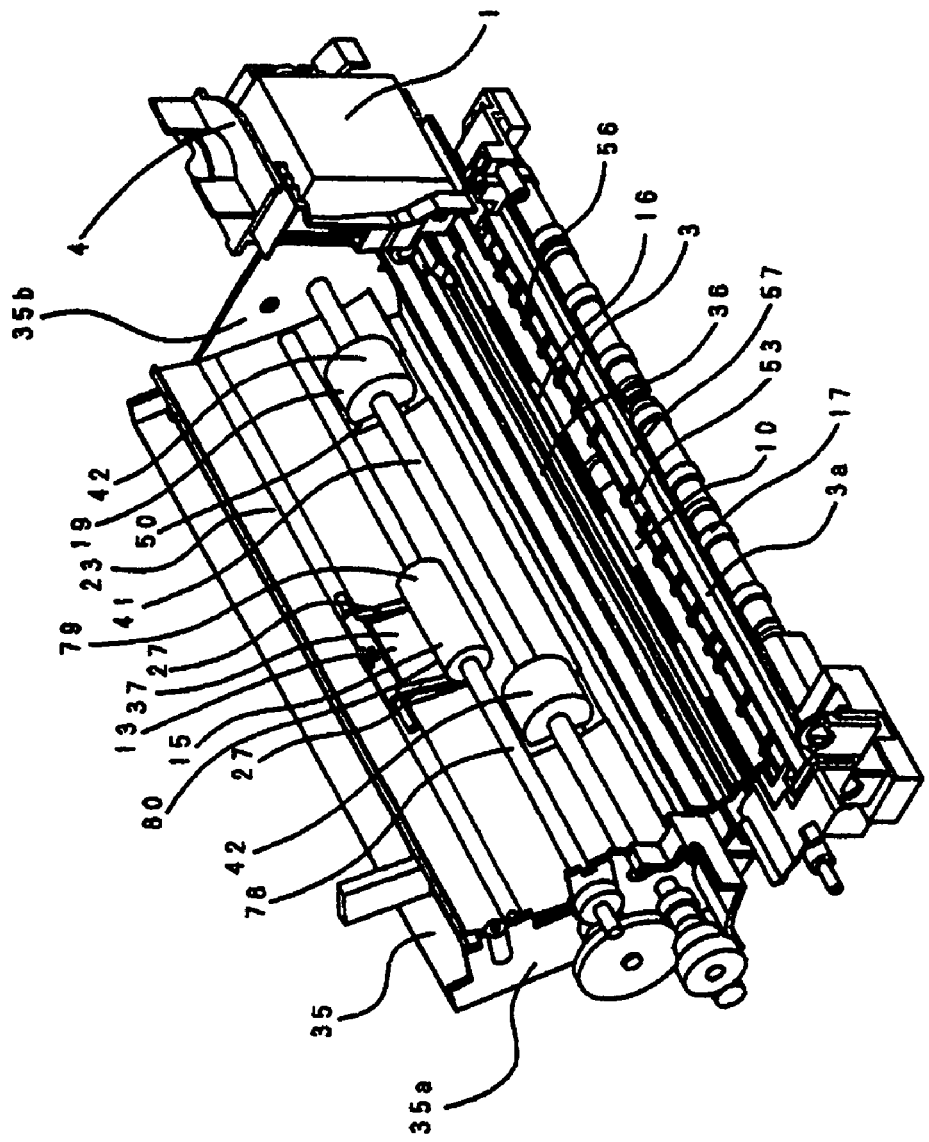
FIG. 3 is a perspective view showing a recording sheet feed unit and a document feed unit in the image forming and reading apparatus.

FIG. 3 is a perspective view showing the recording sheet feed unit 39 and the document feed unit 40. First, the recording sheet feed unit 39 will be explained with reference to FIGS. 1 and 3. Reference numeral 19 denotes a recording sheet feed roller composed of a shaft portion 41 molded of plastic and the like and roller portions 42 which have a diameter larger than that of the shaft portion 41 and are disposed at two positions of the shaft portion 41 and to each of which a frictional elastic member is attached. The shaft portion 41 is journaled by side plates 35a, 35b of a base member 35 at both the ends thereof, and the end of the shaft portion 41 on the side plate 35b side is coupled with a feeding motor through a not shown drive force transmission means.

Further, a presser sheet 9 is interposed between the recording sheet feed roller 19 and the base member 35 as well as turnably journaled by the side plates 35a, 35b of the base member 35. When the recording sheet feed roller 19 rotates, the presser sheet 9 is caused to come into contact with and to be separated from the outer peripheral surface of the rollers 42 by a cam formed integrally with the recording sheet feed roller 19. Further, a pressure sheet spring (elastic member) 34 is disposed in a cylindrical recess 45 formed integrally with the base member 35 and urges the presser sheet 9 against the recording sheet feed roller 19.

Next, a recording sheet feed operation will be explained. In FIG. 1, A denotes a recording sheet feeding path. Each of the roller portions 42, to which the frictional elastic member is attached, of the recording sheet feed roller 19 has a half-moon-shaped cross section formed by combining an arc portion 47 and an approximately linear string portion 48. When recording sheets are stacked, the string portions 48 are approximately in parallel with the presser sheet 9 with a predetermined amount of interval kept therebetween so that the recording sheet bundle 2 can be set therebetween. When the recording sheet feed roller 19 is rotated in a clockwise direction in the figure by driving the feeding motor, the presser sheet 9 is moved by the cam so as to come into contact with the roller portions 42, thereby the surface of the uppermost recording sheet of the recording sheet bundle 2 stacked on the presser sheet 9 comes into contact with the roller portions 42, and the uppermost recording sheet is urged by the pressure sheet spring 34. When the recording sheet feed roller 19 is further rotated, only the uppermost recording sheet of the recording sheet bundle 2 gets over a claw 77, which is disposed at the extreme end of the recording sheet at one end thereof, and is fed to a sheet feeding unit 49 which will be described later.

[Document Feed Unit]

Next, the document feed unit 40 will be explained in detail. As shown in FIG. 1, a lower document guide 23, which is formed of a metal sheet and the like, is fixed to both the side plates 35a, 35b of the base member 35 between the recording sheet feed roller 19 and the recording sheet bundle 2 to reduce a space to be occupied and to obtain a predetermined strength. The position of the lower document guide 23 satisfies the following three conditions. First, in a recording sheet stacked state (that is, when the string portions 48 of the roller portions 42 are approximately in parallel with the presser sheet 9 as well as the string portions 48 and the presser sheet 9 are positioned so as to have the predetermined amount of interval so that the recording sheet bundle 2 can be set in the interval), the recording sheet feed roller 19 stops at such a position that an interval, through which a document can pass, is formed between the string portion 48 and the upper surface of the lower document guide 23. Next, the string portion 48 and the lower document guide 23 has an interval which prevents the contact of the uppermost recording sheet of the recording sheet bundle 2 with the lower document guide 23 even if the recording sheet bundle 2 being set has a maximum volume.

Further, in a recording sheet feed state, when the recording sheet feed roller 19 rotates, the arc portions 47 can pass through cutout portions 50 formed to the lower document guide 23 (refer to FIG. 3), can project from the lower surface of the lower document guide 23, and can be abutted against the uppermost recording sheet of the recording sheet bundle 2.

Further, as shown in FIG. 3, a document feed roller 15, which is composed of a shaft portion 78 formed of metal and a cylindrical friction elastic member 79 attached to the shaft portion 78, is rotatably journaled by the side plates 35a, 35b of the base member 35. The document feed roller 15 is disposed upstream of the recording sheet feed roller 19, and the one end of the shaft portion 78 on the side plate 35a side is coupled with a feeding motor through a reading drive force transmission means 51 and a drive switching means 52 (refer to FIG. 2).

A separation pad support member 37 provided with a separation pad 13 is journaled by the lower document guide 23 and urged against the outer peripheral surface of the friction elastic member 79 of the document feed roller 15 by a not shown elastic member. Preliminary separation arms 27 are journaled on the same axis as that of the fulcrum of the separation pad support member 37 on both the sides of the separation pad 13 and abutted against the outer peripheral surface of the friction elastic member 79 of the document feed roller 15 upstream of the position at which the separation pad 13 is abutted against the document feed roller 15. Further, a document tray 11 is detachably attached to the lower document guide 23 to support documents 12 being set (refer to FIG. 2).

An upper document guide 14 is molded in a strip shape and journaled by the shaft portion 78 of the document feed roller 15 on the upstream side thereof in feeding. The upper document guide 14 is arranged such that when the downstream side thereof is pressed by a document, the shaft portion 41 of the recording sheet feed roller 19 is abutted against the back surface of the upper document guide 14, and the guide surface of the upper document guide 14 projects from the roller portions 42 in the abutment state. With this arrangement, the faulty feeding of the document 12 can be prevented because it comes into contact with the roller portions 42 of the recording sheet feed roller 19.

Next, a document feeding operation will be explained. The documents 12 are set such that the extreme end thereof is accommodated in a wedge space 80 formed by the document feed roller 15 and the separation pad 13. The document feed roller 15 is rotated clockwise by the driving force of the feeding motor to thereby feed the documents being set by separating them one by one from an uppermost document. The separated documents are fed to a sheet feeding unit 49, which will be explained later, through a document feeding path formed of the lower document guide 23 and the upper document guide 14.

[Feeding of Recording Sheet and Document]

The relative positional relationship between the recording sheet feed unit 39 and the document feed unit 40 will be explained. The recording sheet feed roller 19 and the document feed roller 15 are disposed such that the upstream side of the recording sheet feed roller 19 overlaps the downstream side of the document feed roller 15 when viewed from a sectional direction shown in FIG. 1.

In contrast, as shown in FIG. 3, the document feed roller 15 is disposed such that the roller portion thereof is located between the roller portions 42 of the recording sheet feed roller 19 at the two positions in a recording sheet width direction perpendicular to a recording sheet feeding direction to avoid that the recording sheet feed roller 19 overlaps the document feed roller 15.

As shown in FIG. 1, the sheet feeding unit 49 is composed of a platen 3, an auxiliary platen member 3a, a feeding roller 10 journaled by the platen 3, four pinch rollers 16, a pinch roller guide 36, a discharge roller 17, a plurality of spurs 18 abutted against the discharge roller 17, and a spur holder 55. The platen 3 acts as a support surface for supporting the lower side of a recording sheet feeding path 75, the auxiliary platen member 3a is attached in a recess formed on the recording sheet support surface 53 of the platen 3 and acts as the support surface of the lower side of a recording sheet succeeding to the platen 3, the four pinch rollers 16 are abutted against the feeding roller 10 and disposed in the sheet width direction, the pinch roller guide 36 journals the pinch rollers 16 so that they are in pressure contact with the feeding roller 10, the discharge roller 17 is molded integrally of plastic and the like and elastomer and the like, and the spur holder 55 journals the spurs 18 such that they come into pressure contact with the discharge roller 17.

In the sheet feeding unit 49, the feeding roller 10 and the pinch rollers 16 constitute a sheet feeding means, and the discharge roller 17 and the spurs 18 constitute a sheet discharge means. Note that the spurs are rotating bodies which do not disturb a recorded image even if they are in contact with the surface of a recording sheet because they come into contact with the recording sheet in small areas.

Further, a plurality of ribs 56 are formed on the recording sheet support surface 53 of the platen 3 in the sheet width direction, and when a recording sheet is fed, it passes on the upper surfaces of the ribs 56 (refer to FIG. 3).

The auxiliary platen member 3a is journaled by a support portion formed to the platen 3 through shafts formed on both the sides thereof on the upstream side in a recording sheet feeding direction. Although the back surface of the recording sheet support surface 57 of the auxiliary platen member 3a is ordinarily urged by a spring 58 so that the recording sheet support surface 53 of the platen 3 is in registration with the recording sheet support surface 57 of the auxiliary platen member 3a, when the auxiliary platen member 3a is pressed downward by a force exceeding the urging force, it goes down about 5 mm with respect to the sheet support surface 53 of the platen 3.

The feeding direction formed by the feeding roller 10 and the pinch rollers 16 is set in an obliquely down direction from the upstream side to the downstream side of the rollers, and the feeding direction formed by the discharge roller 17 and the spurs 18 is set in an obliquely up direction from the upstream side to the downstream side of the rollers. With the above arrangement, the sheet fed by the sheet feeding unit 49 is fed while being abutted against the sheet support surface 53 of the platen.

Further, the document fed from the document feed unit 40 is also fed to a document reading position by the feeding roller 10 and the pinch rollers 16, and the document, from which data has been read, is discharged by the discharge roller 17 and the spurs 18. That is, the feeding path between the nip portion between the feeding roller 10 and the pinch rollers 16 and the nip portion between the discharge roller 17 and the spurs 18 is used commonly by the recording sheets 2 and the documents 12. Then, they are fed by the same transportation means.

Accordingly, the apparatus can be reduced in size and cost because feeding parts are used commonly.

[Image Forming Unit]

Next, the image forming unit acting as the image forming means will be explained. The apparatus has an inkjet image forming unit mounted thereon as the image forming means. The inkjet image forming unit records desired data by ejecting an ink filled in an ink tank onto a recording sheet from the nozzles formed on an ink head. The ink head of this embodiment includes a nozzle train having 64 nozzles arranged in a row in the recording sheet feeding direction at a pitch of 1/360 inch, and the inkjet image forming unit effectively records the data by moving the ink head in the recording sheet width direction.

Note that, in this embodiment, recording is executed in such a manner that an electro-thermal transducer is energized according a recording signal, and the ink is ejected from an ejection port by the growth and contraction of bubbles generated in the ink making use of the film boiling occurred in the ink by the thermal energy of the transducer. As described above, since the ink is ejected by growing and contracting the bubbles by the thermal energy, the ejection of a fluid excellent in responsiveness can be achieved.

Figure 4:
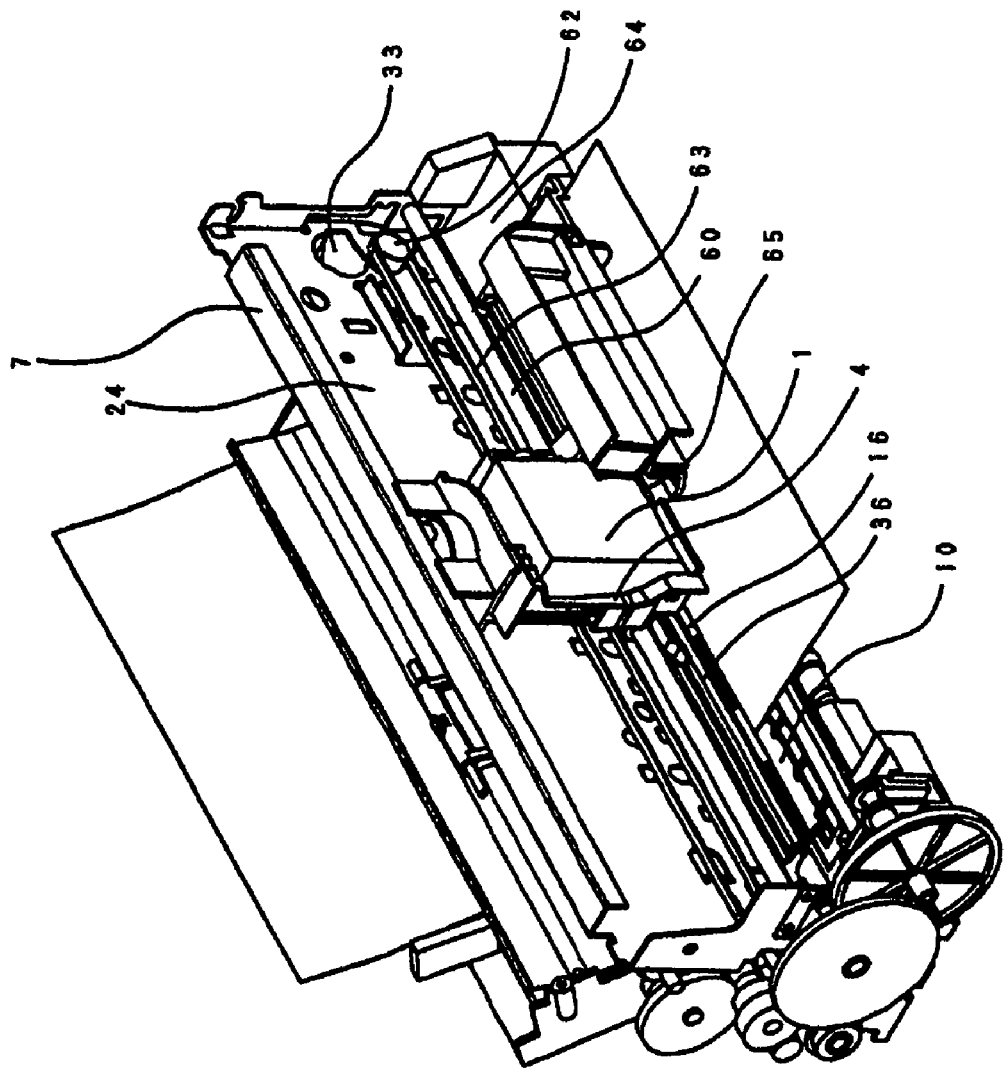
FIG. 4 is a perspective view showing the recording operation in the image forming and reading apparatus and the flow of a recording sheet.

FIG. 4 is a perspective view showing a recording operation. In the figure, the ink tank and the ink head are accommodated in an ink cartridge 1, and the ink cartridge 1 is detachably mounted on a carriage 4. The carriage 4 is guided by a guide rail 7 and a guide shaft 60 so as to be moved in the recording sheet width direction. The guide rail 7 is formed by bending the upper portion of a chassis 24 in a C-shape, and the guide shaft 60 is supported by both the side plates of the chassis 24.

The carriage 4 is engaged with a pinion gear 62 of a carriage motor 33 attached to the chassis 24 at an end thereof and fixed to a carriage belt 63 supported in tension by a pulley attached to the chassis 24 on the other end thereof, thereby the carriage 4 can be moved by driving the carriage motor 33.

A recovery unit 64 is fixed at a position confronting the ink head portion 65 of the ink cartridge 1 at the right end of a carriage moving range. The recovery unit 64 has a pump function for sucking the ink, a wiper function for cleaning a nozzle surface, and a nozzle cap function for preventing the nozzles from being dried in a waiting mode. Further, the ink cartridge 1 stops at the right end of the carriage moving range in the states other than a recording state to cap the nozzles by the nozzle cap function (capping position).

(Capping Position)

Figure 5:
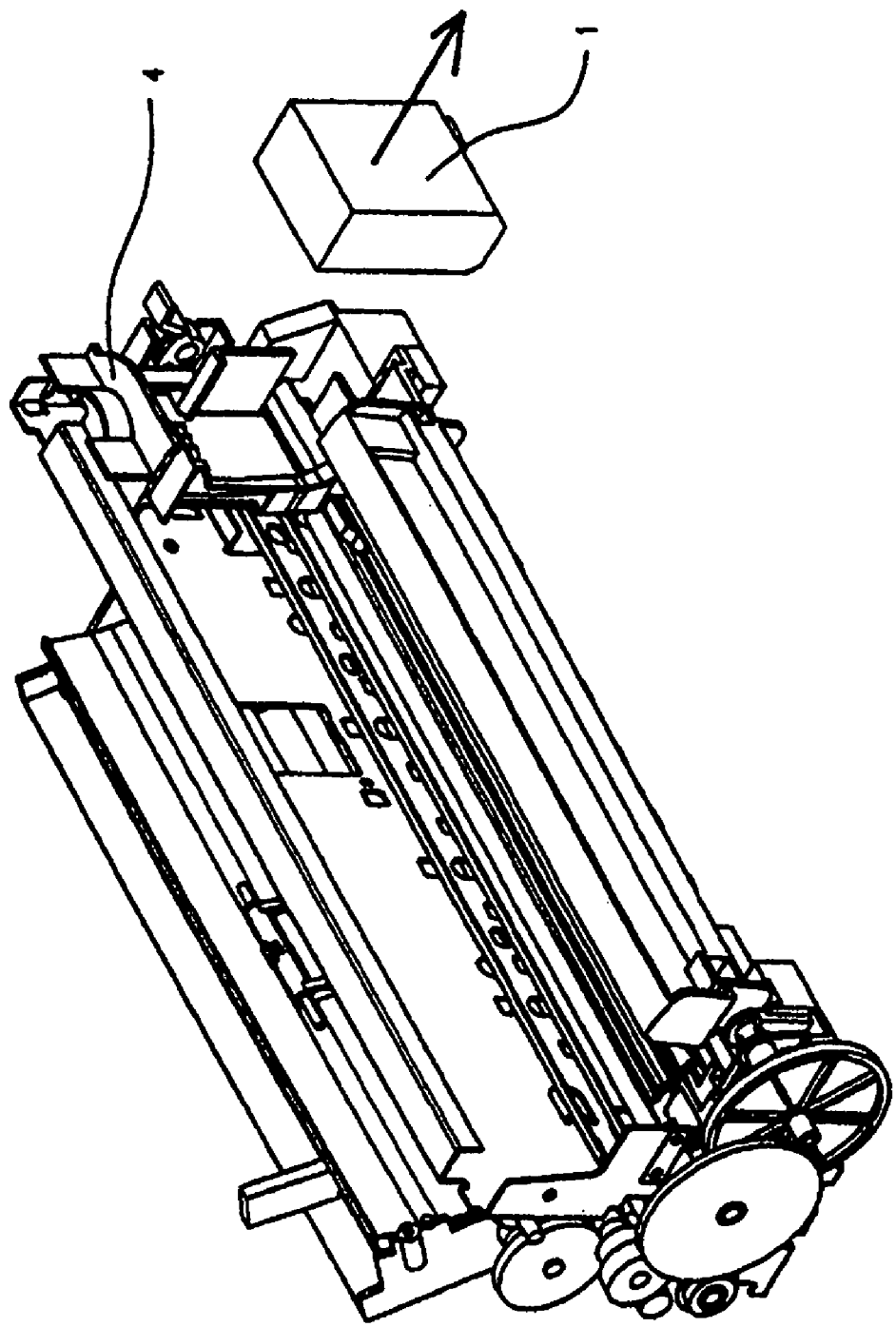
FIG. 5 is a perspective view showing the replacement of an ink cartridge in the image forming and reading apparatus.

As shown in FIG. 5, when the ink in the ink tank is exhausted, the ink cartridge 1 is replaced by removing it located at the capping position forward.

[Image Reading Unit]

Figure 7:
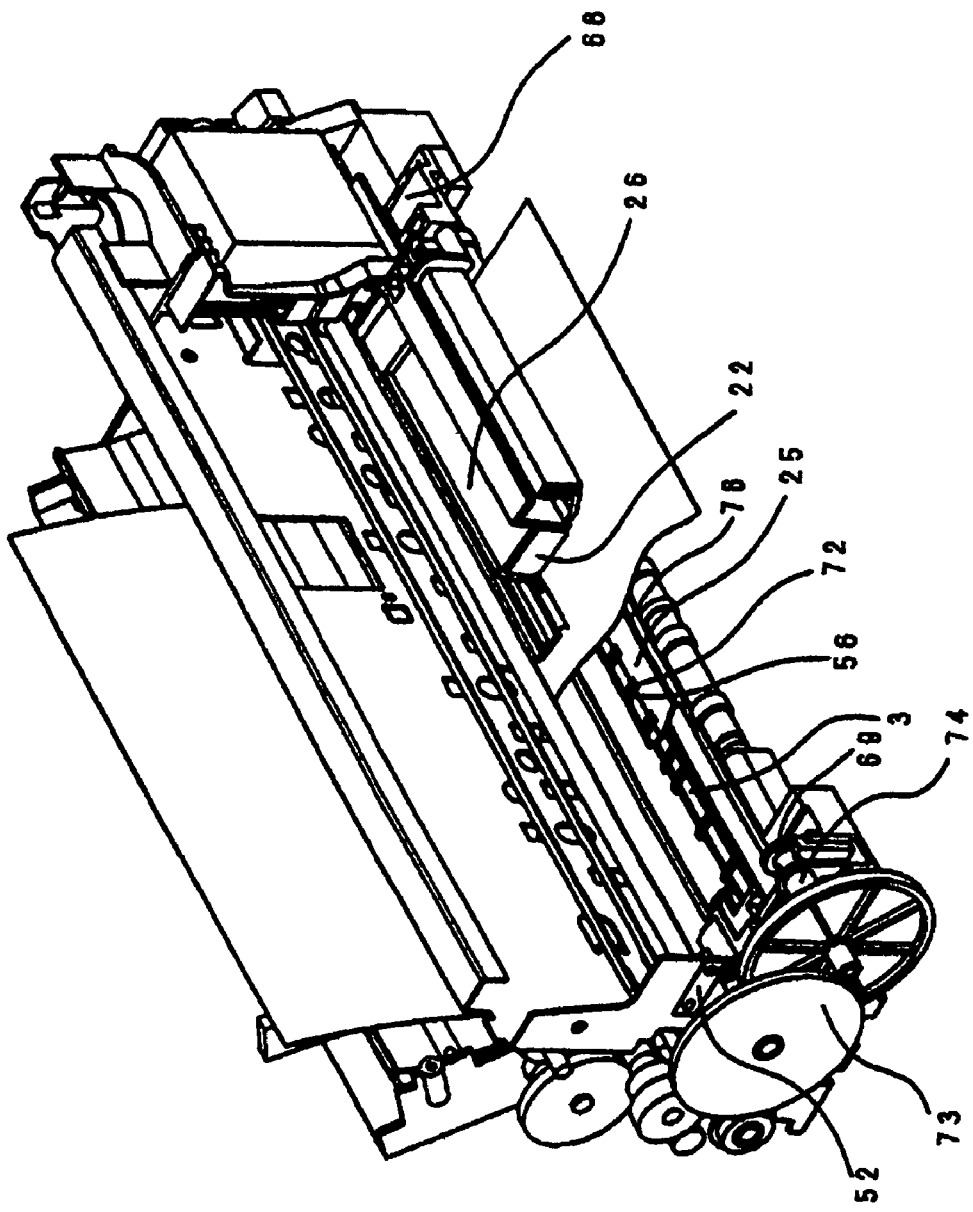
FIG. 7 is a perspective view of the image forming and reading apparatus showing the reading operation and the flow of the document and the second CS holder position.

Next, the image reading unit 28 acting as the image reading means will be explained. FIG. 6 shows a sectional view of the image reading unit 28 in a reading operation, and FIG. 7 is a perspective view of the image reading unit 28 in the reading operation.

The image reading unit 28 is disposed downstream of the image forming unit in the recording sheet feeding direction and composed of a contact image sensor (CS) 22, a CS holder 26, and a white reference 25. The CS 22 is accommodated in a recess formed to the CS holder 26 with a sensor surface 66 exposed outward and fixed by a screw (tightening member).

Disposing the image reading unit 28 downstream of the image forming unit enables a document to be easily processed when it is jammed.

The CS 22 has a read line 22a which is linearly disposed toward a depth direction of FIG. 6. The movable auxiliary platen member 3a described above is disposed at a position confronting the read line 22a. Further, reference numeral 1a in FIG. 6 shows the image forming width of the ink cartridge 1, and when the ink cartridge 1 ejects the ink while being moved, an image having the width 1a can be formed.

As shown in FIG. 6, the relationship between the read line 22a and the image forming width 1a is such that the image forming width 1a is set upstream in the recording sheet feeding direction as well as the CS 22 in the reading state inclines in the feeding direction of the recording sheet 2 so that it is separated from the platen 3 toward the image forming width 1a (toward upstream of the feeding direction).

The CS holder 26 has the white reference 25 acting as a reading density reference member, and the white reference 25 is formed by attaching a white sheet to a metal plate, and the metal sheet is composed of a flat surface, on which the white sheet is attached, and side plates formed by bending the ends of the flat surface in the lengthwise direction thereof.

The white reference 25 has a width larger than the feedingfeed region of a maximum recording sheet fed in the apparatus and is formed to cover at least the image forming width 1a in the sheet feeding direction when an image is read. In this embodiment, the white reference 25 is formed so as to cover the entire region of the platen 3 in the sheet feeding direction as shown in FIG. 6. Further, a hole and the like are not formed in the white reference 25 in the portion thereof confronting at least the image forming width 1a and the read line 22.

Further, an inlet portion 25a is formed to the white reference 25 as shown in FIG. 6, and when the document 12 is being read, it is guided between the CS 22 and the white reference 25.

Holes are formed to the above side plates and a shaft formed to the CS holder 26 is engaged with the holes, thereby the white reference 25 is urged to the CS side by a twisted coil spring in a state that the white reference 25 is turnably supported with respect to the CS holder 26 and the CS 22.

Figure 8:
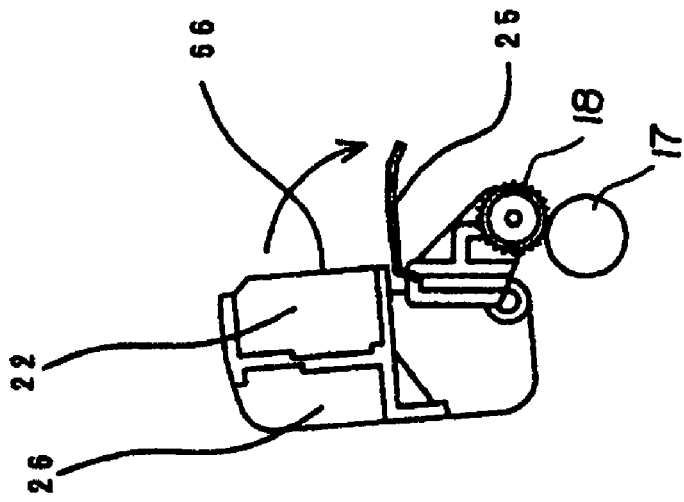
FIG. 8A is a sectional view showing a first white reference position in the image forming and reading apparatus and, FIG. 8B is a sectional view showing a second white reference position.
Figure 8:
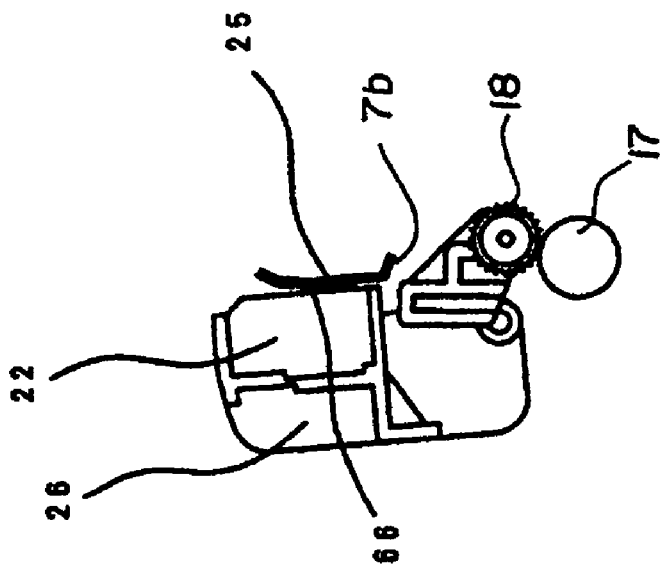
Figure 9:
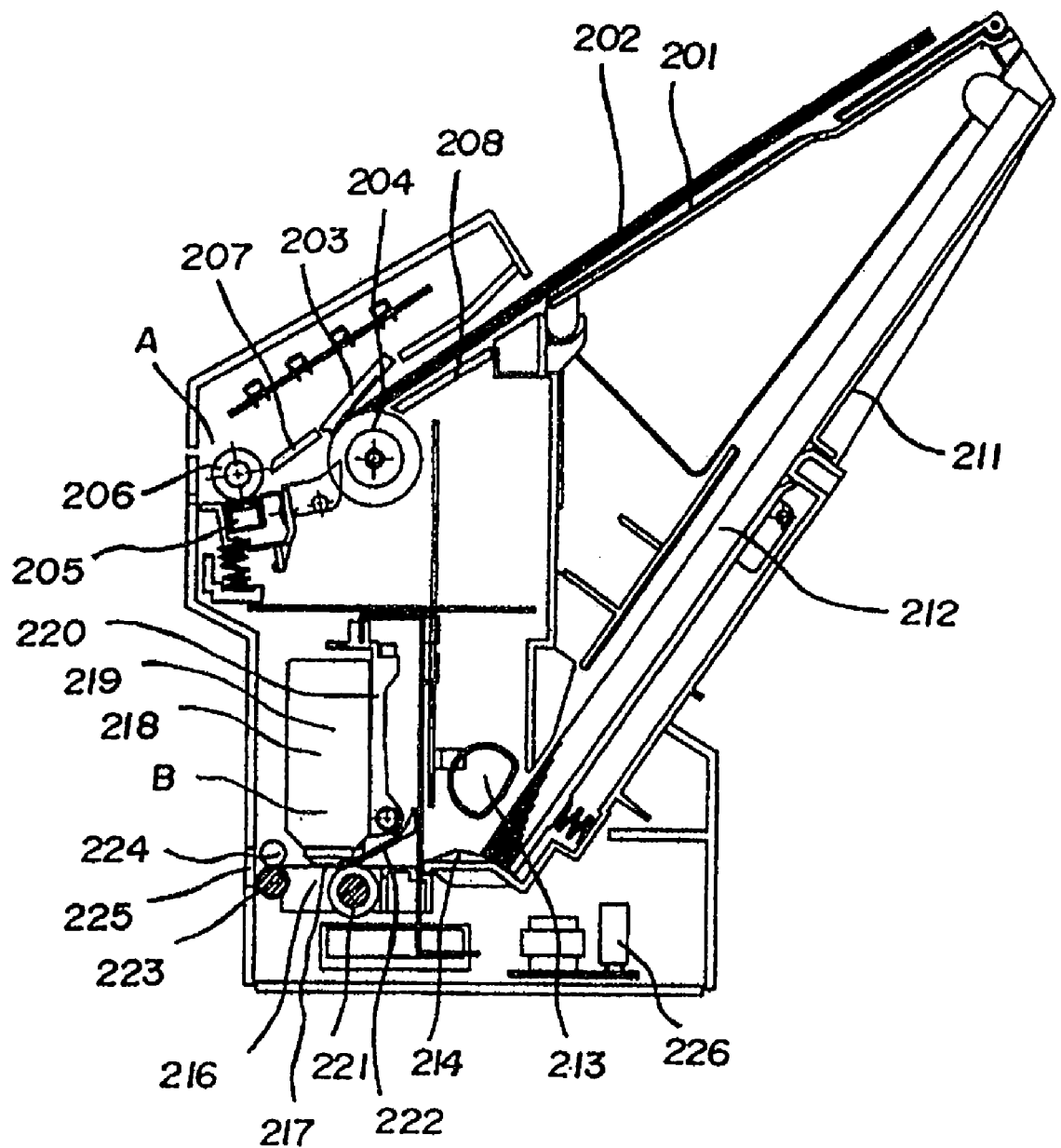
FIG. 9 is a sectional view explaining an image forming and reading apparatus of a background art.

That is, the white reference 25 can be set to a first white reference position shown in FIG. 8A and a second white reference position (cleaning position) shown in FIG. 8B. At the first white reference position, the white reference 25 is urged to the CS 22, and the sensor surface 66 of the CS 22 confronts the white sheet of the white reference 25 with an interval defined therebetween through which at least one document can pass in order to form the document feeding path, and at the second position, the white reference 25 is turned in a direction where it is separated from the CS 22 against the twisted coil spring.

When the white sheet of the white reference 25 or the reading surface of the CS 22 is contaminated by the ink of the image forming unit 38, a user can clean the contaminated portion at the second position.

The CS holder 26 has a hollow boss formed on the right side surface in the lengthwise direction thereof, and a boss is formed to a CS holder support member 68 (refer to FIG. 2) attached to the platen 3 and engaged with the above hollow boss.

Further, the CS holder 26 has a boss formed on the left side surface in the lengthwise direction thereof and engaged with a bearing portion 69 formed to the platen 3. The right and left engaging portions are formed on the same axis, and the CS holder 26 can turn and move from a first CS holder position (waiting position) evacuated from the recording sheet feeding path shown in FIGS. 1 and 2 to a second CS holder position (reading position) shown in FIGS. 6 and 7.

In recording, it is possible to prevent the CS 22 from being contaminated or damaged by a recording sheet when it is being fed by evacuating the CS holder 26 from the common feeding path to the first position, thereby an image can be read in high quality.

Further, the sensor surface 66, which confronts a document at the reading position, can be set in a direction where it does not confront the document at the waiting position by turning and moving the CS holder 26. Accordingly, a space in front of the sensor surface 66, which is necessary to clean the sensor surface 66, can be maximized by a small amount of movement of the CS holder 26, thereby the size of the apparatus can be more reduced.

The first CS holder position (waiting position) is designed to locate at a position with which the carriage 4 of the image forming unit 38 and the ink cartridge 1 attached to the carriage 4 do not come into contact when they are moved in the carriage moving range in recording (although this position is located downstream of the carriage 4 in this embodiment, it may be located upstream thereof) and which does not exceed the maximum height of the image forming unit and is spaced apart from the sheet feeding path.

Since this arrangement can evacuate the CS holder 26 within the height of the image forming unit, the size of the apparatus can be more reduced.

In contrast, the second CS holder position (reading position) is designed to locate at a position that is determined when the CS holder 26 is turned until a document reading feeding path 70, which is formed by the interval between the reading surface of the CS 22 and the white reference 25, is in agreement with the sheet feeding path 75 formed by the sheet feeding unit 49.

Further, when viewed from a sheet discharge direction, the positions of the CS holder 26 in the right and left directions thereof are designed so that the CS holder 26 can be moved to the second position in a state that the ink cartridge 1 is located at the capping position (position at the right end within the carriage moving range).

A comb-tooth portion 72 (refer to FIG. 7) is formed on the metal sheet of the white reference 25 on the upstream side in the sheet feeding direction thereof, and the ribs 56 of the platen 3 enter between the teeth of the comb-tooth portion 72.

Further, as shown in FIG. 6, a bent portion 76 is formed to the metal sheet of the white reference 25 on the downstream side in the sheet feeding direction thereof to increase the strength of the metal sheet in a lengthwise direction. The bent portion 76 pushes down the turnably supported auxiliary platen member 3a and forms the second position.

Further, as shown in FIG. 7, a CS drive means 74, which is coupled with a feedation motor through a drive switching means 52 and a CS drive force transmission means 73, is disposed on the left side of the CS holder 26 in the sheet width direction. With this arrangement, the CS holder 26 is turned to the first or second CS holder position by operating the CS drive means 74 by driving the feeding motor.

That is, when a feeding mechanism, which is used to feed a recording sheet, is also used as a document feeding mechanism in order the reduce the size of the facsimile apparatus, there is a possibility that ink droplets are deposited on the platen located at the position confronting the image forming unit, and thus a document fed on the platen, on which the ink droplets are deposited, may be contaminated thereby. Although the above problem also arises in a recording sheet, a user greatly suffers from the contamination of the document because the document records master information in contrast that the recording sheet records a duplicated image.

Further, when it is intended to feed both of a document and a recording sheet using a feeding means capable of feeding them with a pinpoint accuracy and further to read and record an image in high quality, a reading means and an image forming means must be disposed in the vicinity of the feeding means. However, a light source of the reading means and the brightness and the sensitivity of a photoelectric transducer ordinarily vary, it is necessary to read a density reference plate to periodically obtain density reference information. A white reference plate is often used as the density reference plate. When, however, an image is read in the vicinity of the image forming means, the density reference plate is also disposed in the vicinity of the image forming means. Thus, the density reference plate is contaminated by the ink droplets, by which an image may be poorly read.

However, in this embodiment, the white reference 25 acting as the reading density reference member is evacuated from the common feeding path together with the image reading unit 28. Accordingly, when the document and the recording sheet are commonly fed, the document is not contaminated even if the platen is contaminated in the formation of an image. Further, the density reference member can be also prevented from being contaminated with the ink by the image forming means.

Next, a reading operation will be explained. When the apparatus is in a stand-by state, the CS holder 26 is urged by a not shown twisted coil spring (elastic member) and held at the first CS holder position (waiting position). When the reading operation starts in a state that a document 12 is set, first, the feeding motor is switched to a reading mode by the drive switching means 52.

Then, the document feed roller 15 is rotated through the reading drive force transmission means 51 and the document 12 starts to be fed as well as the CS drive means 74 is operated through the CS drive force transmission means 73, and the CS holder 26 starts to move.

The document 12 is pinched between the feeding roller 10 and the pinch rollers 16 by the document feed roller 15, and, at the same time, the CS holder 26 moves to the second CS holder position.

When the CS holder 26 moves to the second CS holder position, a clutch that couples the CS drive means 74 with the CS drive force transmission means 73 is released. The document 12, which has reached the feeding roller 10, is fed thereby and fed to the document reading feeding path 70. Then, the data recorded on the document 12 is sequentially read by the white reference 25 in a state that it is in intimate contact with the sensor surface 66.

In this aluminum powder, prescan is appropriately executed to correct shading in a state that the document 12 is not located at least at the reading position.

When the document is discharged to the outside of the apparatus by the discharge roller 17 after the rearmost end of it has been read, the feeding motor is driven reversely, the CS drive means 74 is coupled with the CS drive force transmission means 73 through the clutch, the CS holder 26 moves to the first position, and a reading drive switching means is released. As described above, the CS holder 26 is automatically moved to the second position by the moving means only when the document read.

Second Embodiment

In the first embodiment described above, the white reference 25 and the inlet portion 25a have the while background to correct the shading. However, when another white sheet is read and stored in a storage means at the time the apparatus is shipped from a factory and the data of the white sheet is used to correct the shading, it is necessary for the white reference 25 and the inlet portion 25*a* to have the white background to correct the shading. Even in this case, however, it is preferable to use a whitish background.

With the above arrangement, even if the white reference 25 and the inlet portion 25*a* are contaminated, the data for correcting the shading is not affected by the contamination, and further an image can be excellently read because the contaminated portion is concealed by the document itself.

What is claimed is:

1. An image forming and reading apparatus comprising:
   a recording sheet feeding portion which feeds a recording sheet;
   an original feeding portion which feeds an original;
   a feeding roller which transports the recording sheet fed by the recording sheet feeding portion or the original fed by the original feeding portion;
   a movable carriage which carries a recording head for discharging ink to form images on the recording sheet;
   a platen for supporting the recording sheet on which images are formed by the recording head;
   a reading portion which reads images on the original, the reading portion being rotatable against the platen; and
   a cap which caps the recording head at an end portion of a moving range of the carriage,
   wherein in a case that images are recorded on the recording sheet by the recording head, the reading portion moves to a first position which is out of a moving range of the carriage, and in a case that images on the originals are read by the reading portion, the carriage moves to a position to cap the recording head and the reading portion moves to a second position which is inside of the moving range of the carriage and not contacting the cap capping the recording head.

2. An image forming apparatus according to claim 1, wherein the reading portion has a white reference to support the recording sheet at the second position and a contact image sensor for reading images of the original, and the original passes between the white reference and the contact image sensor.

3. An image forming apparatus according to claim 2, wherein the white reference can rotate to separate from the contact image sensor.

* * * * *